(12) United States Patent
Casler et al.

(10) Patent No.: US 8,024,156 B2
(45) Date of Patent: Sep. 20, 2011

(54) USING STATISTICS TO LOCATE SIGNALS IN NOISE

(75) Inventors: David C. Casler, Montrose, CO (US); Joan L. Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/825,882

(22) Filed: Jun. 29, 2010

(65) Prior Publication Data

US 2010/0268510 A1    Oct. 21, 2010

Related U.S. Application Data

(63) Continuation of application No. 11/265,512, filed on Nov. 3, 2005, now Pat. No. 7,869,980.

(51) Int. Cl.
*H04L 7/00* (2006.01)

(52) U.S. Cl. ........................... 702/190; 375/354

(58) Field of Classification Search ............ 702/69, 702/179, 181, 189–191, 193–195, 197; 324/620, 324/622; 382/275
See application file for complete search history.

(56) References Cited

U.S. PATENT DOCUMENTS

| | | | |
|---|---|---|---|
| 5,764,307 A | 6/1998 | Ozcelik et al. | |
| 5,802,218 A * | 9/1998 | Brailean | 382/275 |
| 5,802,481 A | 9/1998 | Prieto | |
| 5,974,181 A | 10/1999 | Prieto | |
| 6,633,683 B1 | 10/2003 | Dinh et al. | |
| 6,674,795 B1 | 1/2004 | Liu et al. | |
| 6,674,817 B1 | 1/2004 | Dolle et al. | |
| 2003/0067999 A1 | 4/2003 | Echavarri et al. | |
| 2003/0078024 A1 * | 4/2003 | Magee et al. | 455/296 |
| 2004/0076246 A1 | 4/2004 | Vanderperren et al. | |
| 2004/0204880 A1 | 10/2004 | Cheriet et al. | |

OTHER PUBLICATIONS

Choy et al.; "Adaptive Image Noise Filtering Using Transform Domain Local Statistics"; Optical Engineering; Aug. 1998.

* cited by examiner

*Primary Examiner* — Manuel L Barbee
(74) *Attorney, Agent, or Firm* — Whitham, Curtis, Christofferson & Cook, P.C.; Douglas A. Lashmit

(57) ABSTRACT

Computation of variance or variance of the autocorrelation over a moving window of various sizes of a signal containing noise and possibly a small digital signal provides a sensitive, frequency independent indication of the likelihood of the presence of a small pulse, chirp or even spread spectrum digital signal possibly obscured by noise or larger signals in the signal to much lower signal-to-noise ratios than previously possible. Large signals in the signal which may also obscure any small signal are removed to a different signal path from the noise and small signals by subtraction after compression and reconstruction of the large signal. The compression noise thus added to the signal may also increase sensitivity of the variance of the autocorrelation to small signals obscured by the large signals. Controlling storage in response to the computed variance or variance of the autocorrelation allows substantial avoidance or limitation of storage of signals which contain only noise.

11 Claims, 10 Drawing Sheets

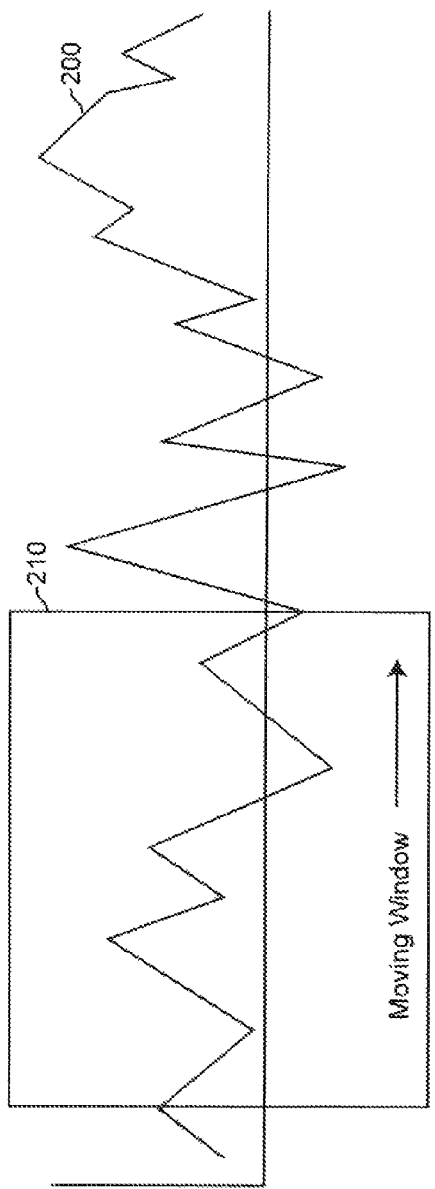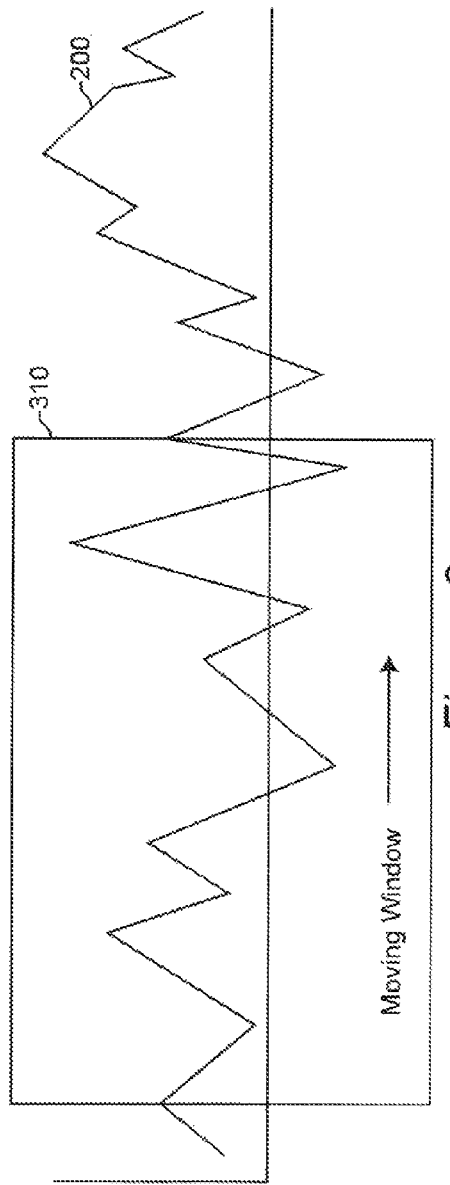

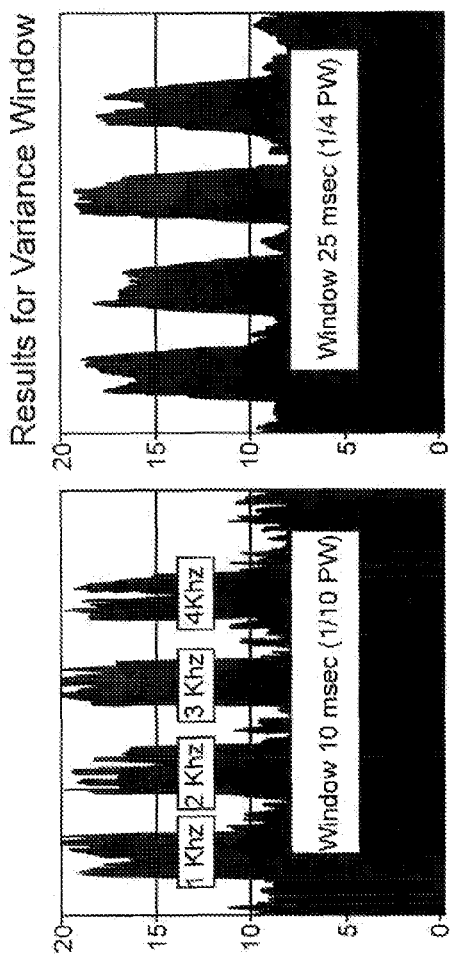
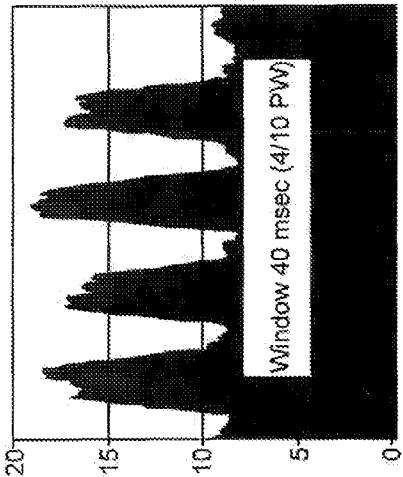
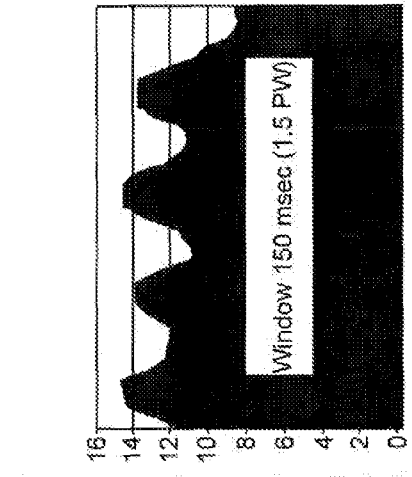
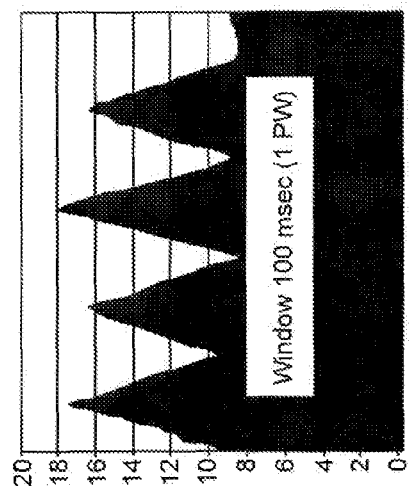
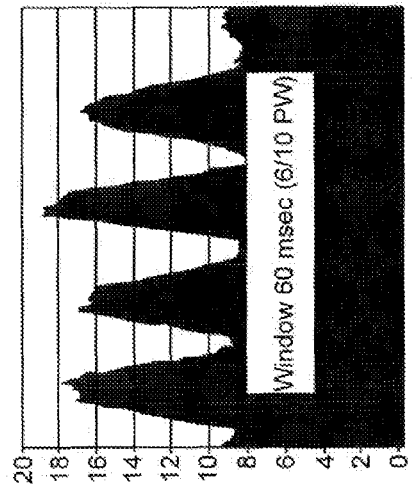
*Figure 5A*
*Figure 5B*
*Figure 5C*
*Figure 5D*
*Figure 5E*
*Figure 5F*

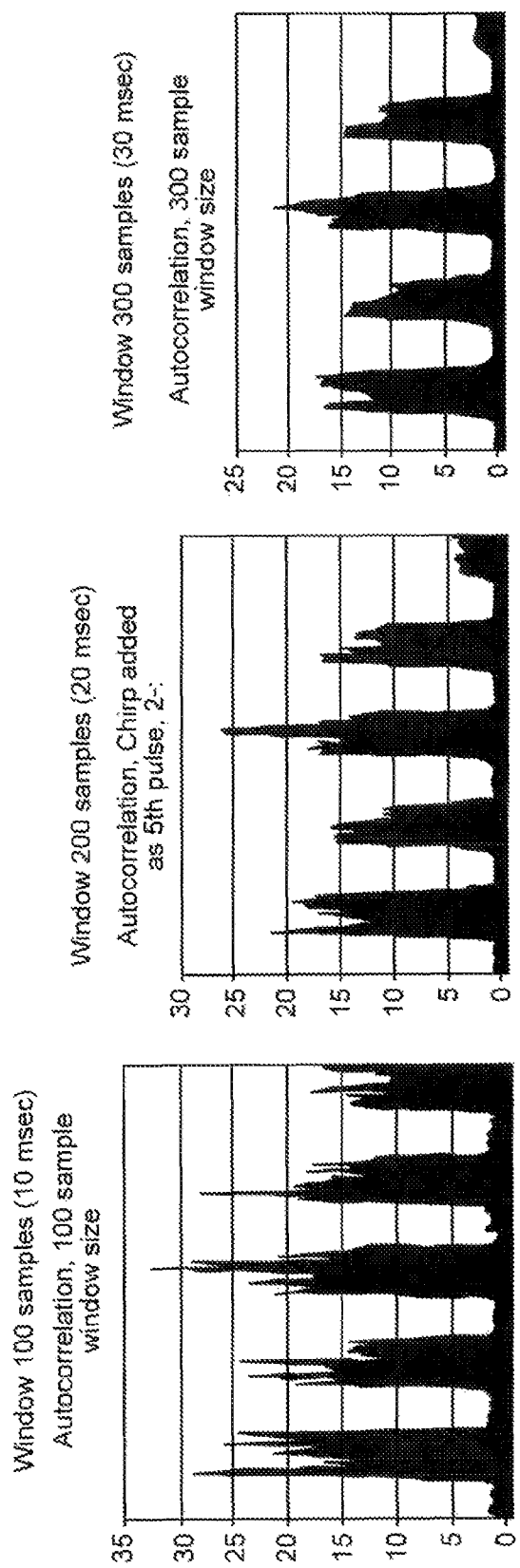

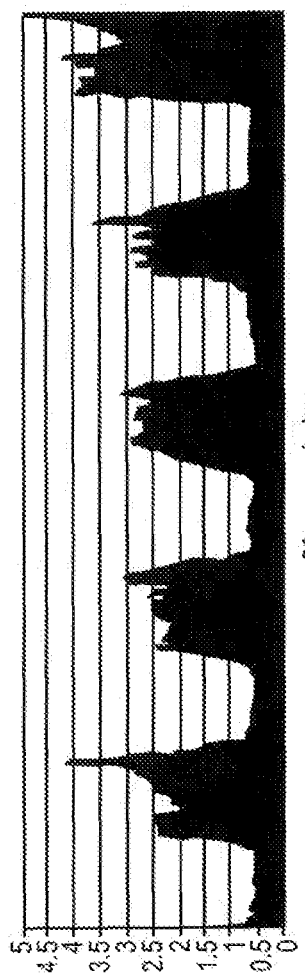
10 msec window
*Figure 8A*
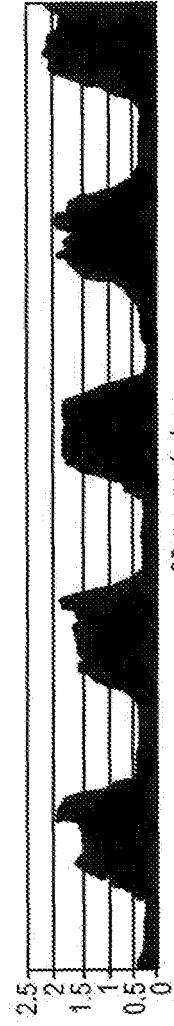
20 msec window
*Figure 8B*
30 msec window
*Figure 8C*
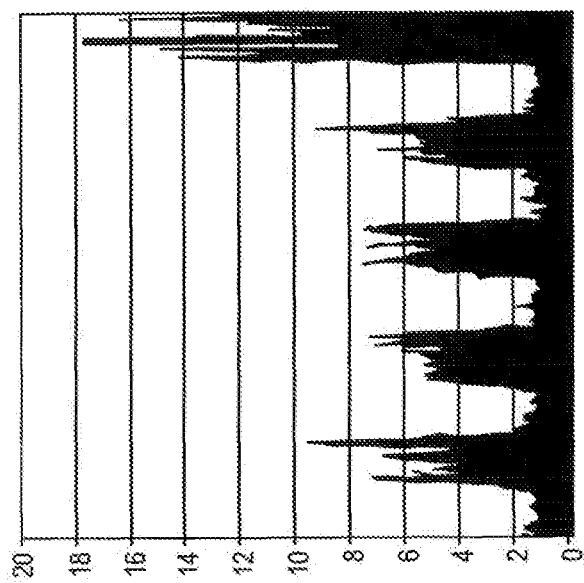
PSD to same scale as previous chart
*Figure 8D*

USING STATISTICS TO LOCATE SIGNALS IN NOISE

CROSS-REFERENCE TO RELATED APPLICATIONS

This application is a continuation of U.S. patent application Ser. No. 11/265,512, filed Nov. 3, 2005, now U.S. Pat. No. 7,869,980, assigned to the Assignee of the present invention, which is hereby fully incorporated by reference and benefit of priority of which is hereby claimed.

STATEMENT OF GOVERNMENT INTEREST

This invention was developed in connection with Government Contract Number H98230-05-C-0622. The United States Government therefore has certain rights in this invention.

BACKGROUND OF THE INVENTION

1. Field of the Invention

The present invention generally relates to data signal detection, compression and storage and, more particularly, to pre-detection and possible detection of weak signals in the presence of noise, partial removal of noise and compression of signals for storage consistent with detected data signal preservation.

2. Description of the Prior Art

Many applications exist at the present time and are foreseeable in which vast quantities of signals are acquired and which may exceed the capacity of facilities for processing the signals concurrently with the acquisition thereof. Such applications include, but are not limited to astronomical observations (e.g. optical and radio telescope images), surveillance video and other sensing arrangements such as intrusion monitoring, meteorological observations, manufacturing facility condition monitoring, communications monitoring, medical monitoring and/or imaging, radar and sonar observations, location tracking (e.g. through a Global Positioning System), and the like. As can be appreciated, in many of these applications, the nature of the data signal of interest may not be known with precision prior to implementation of the application but where logging of as much data as possible may be desirable in order to later search for data which may correspond to an anomalous observation such as determining the cause of a variation of manufacturing yield, determination of an unanticipated failure mode, determining the orbit of an astronomical object from data prior to its discovery (e.g. data in which the object might have been observable but was not detected), and the like. Similarly, many such applications produce signals in which high noise levels are unavoidable and may substantially exceed the levels of signals which, if found, may later be determined to be of interest.

Both the extraction of data signals from noise and the extraction of data of interest from other data in a signal may require specialized and computationally intensive processing, the nature of which may vary widely and require extensive experimentation to determine the nature of the data signal of interest as well as to reduce other signals which are not of interest and are thus effectively noise. Such experimentation and/or processing may require extended periods of time and may be performed long after the acquisition of the signal. Therefore, it is desirable in such applications to store signals with as much fidelity as can be practically accommodated in order to avoid loss or diminution or obscuring of data signals which may later be found to be of interest even though such vast amounts of data, as a practical matter, cannot be accommodated without some degree of compression which will necessarily result in some degree of data signal degradation or inclusion of some degree of compression noise, even though compression techniques exist (e.g. JPEG, MPEG, MP3, etc.—it is assumed that particular compression techniques are known and preferred for particular applications) which can provide an arbitrary degree of compression and optimal degree of fidelity to the original signal for a given amount of compressed data which can, in fact, be accommodated.

Lossless compression techniques are also known but lossless data compression of a signal in the presence of noise generally achieves only about a two to one compression. True noise is incompressible. Further, noise disrupts the predictability of any data signal which may exist within the noise and therefore interferes with any compression algorithm which may be applied. Also, it has been attempted to simulate and compress a noisy signal by separating the data signal from the noise and representing the noise by the parameters thereof in order to achieve a greater degree of compression of a noisy signal. However, this approach is processing intensive to separate the data from the noise while the resulting compressed signal, when decompressed, merely imposes a texture on the extracted signal and does not preserve any data signal which may be hidden in the noise (e.g. a low level data signal in addition to a larger data signal which can, in fact, be separated from noise).

However, in applications such as those alluded to above, it is often the case that data signals may not be present for substantial periods of time and the signal obtained may comprise only noise while the noise may effectively prevent or greatly impede the determination of whether or not a data signal is also present within the noise; thus, if it is desired to store the signal, presenting the problem of requiring storage of vast amounts of incompressible noise. (As used herein, the term "data signal" will denote a signal other than noise which may contain information or otherwise be found to be of interest whereas the term "signal", alone, will denote a signal which includes noise and may or may not include a "data signal".) On the other hand, if no data signal is present in the signal acquired there is no need to store or further process the signal and the signals where no data signal is present can be discarded or the noise function can be represented with an arbitrary representation of the noise function which represents a noise compression by an arbitrary amount but would not preserve the actual noise or any small signal obscured within it. However, no techniques exist which can provide such a determination with sufficient rapidity to reliably avoid storage of seemingly "noise only" signals where a data signal may be of lower amplitude or power than the noise component or to allow for storage or compression without actually determining the signal of interest. On the contrary, numerous theories have been substantially accepted in the art that such discrimination or screening of signals for data signals cannot be accomplished below a certain signal-to-noise ratio (SNR) thresholds and processing to improve the SNR often requires not only knowledge of the presence of a data signal but some characteristics of the data signal in order to preferentially enhance it. At the present state of the art, therefore, where no characteristics of a data signal are known in advance, the data signal must have a threshold greater than that of the noise to be detected. For most automated data signal detection, a SNR of +10 db is commonly considered to be the minimum signal level which permits detection of unknown data signals amid noise for purposes of screening acquired signals for the presence of data signals having an arbitrary form which is not known in advance.

SUMMARY OF THE INVENTION

It is therefore an object of the present invention to provide a system and method for determining portions of a signal in which a data signal may be present and portions of a signal which are devoid of any recoverable data signal and to do so at data signal levels significantly below noise levels in the signal.

It is another object of the invention to provide a system and method for applying different degrees of compression to respective portions of a signal to preserve fidelity of portions in which a data signal may be present while minimizing required storage through minimization of storage media and processing allocated to signals which are devoid of recoverable data signals.

It is a further object of the invention to provide and apparatus and method for discriminating at least some basic parameters of a data signal which may be masked by noise in the course of screening signal portions for the presence or absence of recoverable data signals.

In order to accomplish these and other objects of the invention, a method, possibly implemented in software, to detect likelihood of presence of a small data signal in a signal including noise is provided comprising steps of determining statistics of the signal, detecting changes in the statistics of the signal, and determining the likelihood based on the changes, preferably by computing the variance of the autocorrelation of the signal over a moving window and preferably repeated using windows having several durations and preferably controlling signal compression and/or storage based on a result of such detection.

In accordance with another aspect of the invention, an apparatus or an instrument containing apparatus is provided comprising a filter for removing a portion of noise from an original signal to provide a filtered signal, a subtractor for performing a phased subtraction of the filtered signal and the original signal to produce a noise signal, and an arrangement for calculating a variance of an autocorrelation of the noise signal over respective time windows of the noise signal.

BRIEF DESCRIPTION OF THE DRAWINGS

The foregoing and other objects, aspects and advantages will be better understood from the following detailed description of a preferred embodiment of the invention with reference to the drawings, in which:

FIGS. 2 and 3 are graphic depictions of the signal detection process preferred for practice of the invention, FIGS. 5A, 5B, 5C, 5D, 5E and 5F are graphs of the variance of the signal of FIG. 4, FIG. 8 illustrates the effect of sliding window size on detection of spread spectrum signals.

DETAILED DESCRIPTION OF A PREFERRED EMBODIMENT OF THE INVENTION

Figure 1:
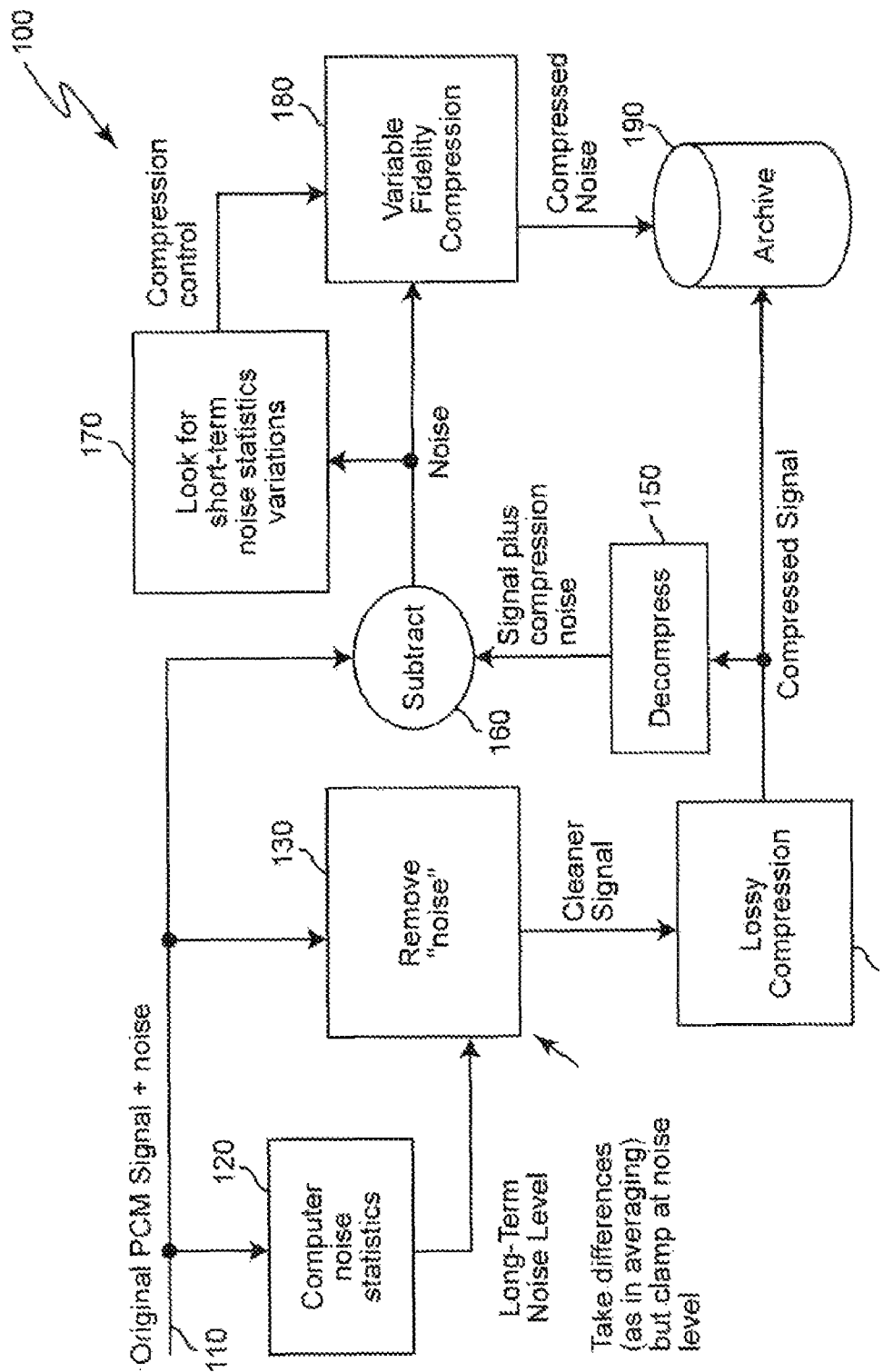
FIG. 1 is a data flow diagram or schematic depiction of the basic architecture of a preferred form of the invention.

Referring now to the drawings, and more particularly to FIG. 1, there is shown a schematic representation of the architecture of a preferred embodiment 100 of the invention which can also be understood as a high level data flow diagram, as well. It should be understood that some elements or processes depicted are known, as will be identified below, while others are unique to the present invention as is the organization and interaction of the depicted elements. Therefore no portion of FIG. 1 is admitted to be prior art in regard to the present invention other than as may be indicated below that certain known processes are considered suitable for use as specific, individual depicted elements or processes.

It should be kept in mind during the following discussion that the invention is principally directed to screening of a signal for the presence of data signals, some of which may be relatively small and which approximate or are below the amplitude of noise in the signal and thus difficult to detect in the presence of noise so that portions of a signal which are likely to contain a data signal, whether large or small, may be saved preferentially to signals which are likely to contain only noise and with the highest practical degree of fidelity. Data signals near or below the noise level will be sometimes referred to as small signals or small data signals to distinguish them from larger data signals which may be more readily detected amid noise due to their greater amplitude and/or power. As distinguished from small data signals, large data signals can not only be readily detected and categorized in a noisy signal by, for example, comparison to a threshold after passing them through a matched filter or by simple comparison of voltages or the like but, in general, techniques are known to extract them from the noise in a signal or at least to reduce the noise level relative thereto and increase the SNR, often to a substantial degree, with relatively rapidly executed pre-processing such as low pass filtering, comb filtering for periodic noise, etc. which can be done by analog, digital or hybrid techniques and often in real time. Large data signals may also be compressed and stored by any of a variety of techniques which may be suitable for the nature of the large signal. However, the presence in a signal of large data signals does not preclude the presence of small data signals which cannot be so readily detected or processed. It is therefore desirable to store a signal including a small data signal in a manner which preserves the greatest practical degree of fidelity in view of the difficulty of analyzing them, particularly where their nature may be unknown and difficult to determine. It should also be appreciated in this regard that, for purposes of detection of small data signals, large data signals can also serve to mask small data signals and are, in effect, "noise" relative to the small data signals.

The original signal, whether from a transducer or a temporary recording or some other source is input to the system at 110 and, preferably, noise statistics are computed at 120 by any known technique and the noise statistics data is used to remove as much noise as possible or convenient at 130. The technique of noise removal is not critical to the practice of the invention and many known techniques are suitable such as that described in "Gray Scale Image Coding for Freeze-Frame Videoconferencing" by D. Anastassiou et al., IEEE Trans. of Communications, COM-34, No. 4, pp. 382-394 (April, 1986) which describes a non-linear filter in which the differences between a current sample and adjacent samples are clamped at approximately the noise level and the differences averaged and the sum of the clamped differences is then weighted and subtracted from the current sample. However, if a large data signal is present, it is preferred to substantially remove it (while preferably recording its content) as will be described below before proceeding with determination of the presence of small data signals. In general, the principal reason for noise removal 130 which is generally facilitated by computation of noise statistics 120 is to achieve a signal which is at least slightly "cleaner" and of improved SNR than the original signal so that lossy or lossless compression (e.g. a discrete cosine transform such as is used in JPEG compression), performed at 140, can potentially be greater and to isolate the noise which may contain a small data signal.

The "cleaned" signal (which will generally still contain significant noise as well as the large signal) is then compressed at 140 by any lossy or lossless compression technique. This compressed signal is archived at 190 which also archives, in compressed form, any large signal present.

The compression thus performed introduces some compression noise. Compression noise is defined as the difference between the original signal and the signal reconstructed by decompression 150 and which not only will have characteristics and statistics which are generally much different from the original noise present in the signal input at 110 but are, to a degree, predictable. While the parameters of the compression technique chosen for this process may have some effect on the resulting signal, such parameters are not important to the basic principles of the invention or its practice in accordance therewith. The output of decompresser 150 is thus substantially the same signal as that input at 110 but with some portion of the original noise (and small signals therein) removed and with some additional and partially predictable compression noise introduced. That is, any large data signal originally present will be substantially the same as that in the decompressed signal but the signals will differ in regard to the magnitude of original noise and the presence of compression noise. Therefore, when the reconstructed signal (possibly containing a reconstructed large data signal if a large data signal is present in the original signal) is subtracted from (or added to, since the signal is AC and subtraction and addition processes differ only in phase for producing the same result) the original signal or vice-versa, either of which may be scaled to emphasize the original noise, any large data signal is removed and only a combination of the original noise, possibly containing a small data signal, and the compression noise will remain, the latter not affecting or affecting in only a predictable way short term variations in the noise statistics of the original noise. In essence, this process of lossy or lossless compression 140 and decompression 150 achieves a removal of large signals and an increase of compression noise but allows the original noise, possibly containing a small data signal, to be preserved. The remaining signal may then be compressed for archival storage 190 in accordance with any short term variations in noise statistics which may be detected at 170 (and which may indicate a likelihood of the presence of small data signals) by a controllable compression arrangement 180 which can controllably alter the degree of compression employed allowing reduction of storage (including the possibility of no storage, storage of only a sample of the noise or storage of only the noise characteristics) if no small signal is likely and preserving fidelity of the original signal to the greatest practical extent (including the possibility of no compression at all) if the presence of a small data signal is likely.

In general, it will be desirable to greatly compress or even discard any portions of the noise signal for which the local or short term statistics do not vary significantly from the long term (e.g. noise) statistics (e.g. above a particular figure of merit which will be discussed below) but it may be desirable to archive relatively high fidelity samples of noise in which no such variations are detected for future reference. Conversely, if short term variations from noise statistics are detected, it will be generally desirable to archive the noise at high or complete fidelity with little, if any, compression, since, this assures that the small signals, the presence or likelihood of presence of which has been detected by the invention, are not discarded. If compression for archival storage is performed in either case, the form or process of compression is not critical for the practice of the invention and known techniques such as discrete cosine transformation, well known in JPEG compression, are certainly well-suited to this operation.

Computations 120 for determining noise statistics such as variance, probability density function or even power spectral density are well-known to those skilled in the art and while many are computationally intensive, software capable of rapid execution is also known and, for purposes of the present invention, some simplifying assumptions and procedures can be made and result in even more rapid execution of required computations. These simplifications will be explained graphically herein for clarity and generality while modification of known algorithms to perform the same will be readily apparent to those skilled in the art; particularly in view of examples used in the development and proof of concept of the invention which will be provided below.

It should be appreciated that the signal processing above provides an effective isolation of the noise which may contain a buried small data signal which the invention seeks to find by separating large signals from the noise which may contain small signals into separate paths (even though additional compression noise is introduced) through noise removal 130, lossy or lossless compression 140 and decompression 150 prior to a subtraction operation 160 such that only the original noise signal which can contain a small data signal and compression noise remains. (Since the compression noise is partially predictable and different from the original (e.g. background) noise, it may cause the system in accordance with the invention to save the signal with higher fidelity and allow the system, upon decompression, to reconstruct this noise and thus, desirably, since any noise stored with the large signals will differ from the original noise, enable an analyst to determine the state of the system when the large signals were received.) In this regard, it is considered to be an important aspect of the invention that the addition of compression noise resulting from the extraction of large signals and examination of that compression noise with the original noise for changes in statistics improves detection of small signals which may be obscured by large signals. Because of the effectiveness of this isolation, the presence of a buried small data signal can be determined with increased sensitivity based on the general assumption that the presence of any data signal will cause a short-term change or variation in the statistics of the noise signal. However, the nature of the variations which will be effective to indicate the presence of a data signal or the sensitivity with which such a detection can be made is not at all evident from that general assumption, even if the nature of the data signal and/or the statistical parameters of the noise could be known in advance, particularly in a signal which contains both the original noise and compression noise. It should be kept in mind, in this regard, that the invention avoids any need or reliance upon advance knowledge or even assumptions concerning the nature of the signals to be detected and seeks to detect signals which are masked by noise and which may even be designed to emulate noise. This is in sharp contrast and directly opposed to some applications such as radar where the nature of the propagated signal is precisely known or other applications where only signals which are expected to have one or more particular characteristics are of interest for which approaches collectively referred to as matched filter-based approaches often provide good performance.

In other words, while matched filter approaches and the like look at or for a particular signal having certain characteristics which may be more or less known or assumed, the invention uses a novel approach of basically looking at the noise, determining the statistics of the noise and detecting variations in those statistics as an indication of the possible presence of a signal of any arbitrary nature. However, the relative sensitivity or even utility of particular statistics or variations therein or the relative dependence on or, desirably, independence of the nature of particular signals cannot be estimated from the general nature of that approach.

Referring now to FIGS. 2 and 3, the general methodology of detecting short term variation in parameters of the noise will be discussed. Line 200 in each of FIGS. 2 and 3 represents a signal containing noise and possibly a data signal and can be considered as a large number of points or samples for purposes of computation of the parameters of the noise signal. Either the entirety of the signal or any relatively long portion of signal 200 or even a portion of signal 200 known or presumed to be devoid of data signals, even if relatively short, a theoretical computation, hardware tests, historical data or experience or the like can be used to compute the statistical parameters of the noise signal which generally will be relatively stable if not substantially constant. As a practical matter for practice of the invention on a signal as it is captured, it is preferred to perform a running computation of a particular parameter of the signal based on samples collected to the current time but to discard older samples when the number of samples become too large for practical computation. Such a process also accommodates long term changes of the parameter of interest of the signal.

To obtain the corresponding so-called short term parameter of the signal, a moving window 210 is imposed on the signal 200 and the parameter of interest computed on samples within the moving window. This computation can be simplified by recognizing that, as a window of constant size is moved along the signal one sample is added at one side of the window and one sample is removed from the other side of the window for each incremental position of the window. The relative size of the window compared with the number of samples from which the statistics of the noise component of the signal which is assumed to be relatively stable are computed is not important to the basic principles of the invention. It can be readily appreciated that a data signal appearing in a data sample can thus alter a short-term parameter of signal 200 as it enters or leaves the window. However, for much the same reason, it is apparent that the length of the window may have a substantial effect on the sensitivity of the detection of a small data signal depending on properties of the small data signal itself. While it has been found experimentally, as will be discussed below, that the system in accordance with the invention can detect pulses substantially longer than the window used (where variation of samples within a given window might be expected to resemble the variation of basic background noise), by virtue of using a moving window, it is possible for relationships between window size and signal parameters (such as inter pulse interference) to reduce sensitivity and efficiency of the system. However, this potential difficulty can be readily avoided by performing similar processing using windows of different sizes, as will also be discussed in greater detail below.

Figure 4:
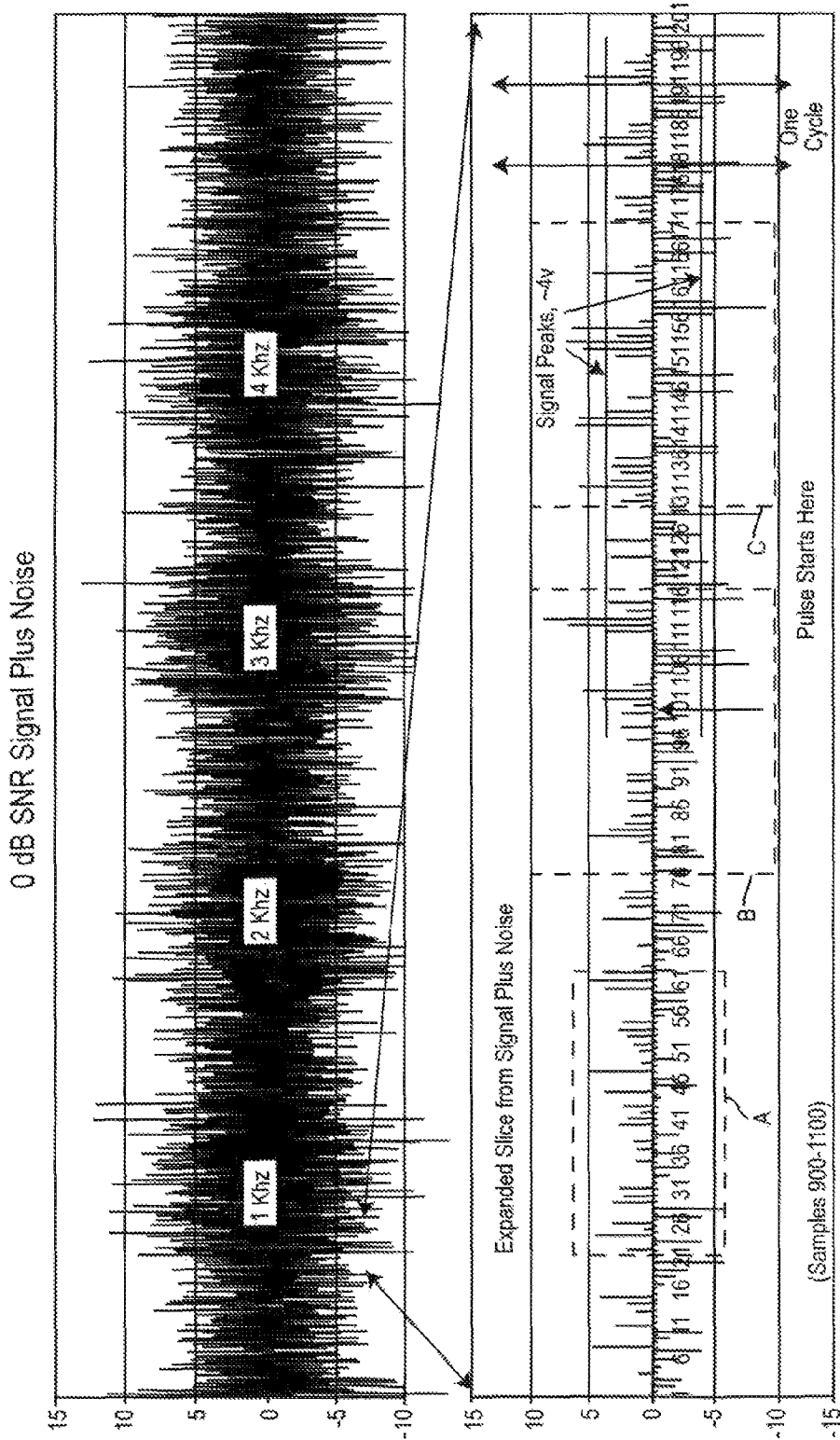
FIG. 4 shows a waveform comprised of additive white Gaussian noise and four pulses of different frequencies and an expanded portion thereof.

The effects, for purposes of small data signal detection, of comparison of a parameter of a signal computed over different periods or window lengths in accordance with the invention is illustrated in FIG. 4. The upper trace of FIG. 4 shows a signal which (for purposes of this example) is bandwidth limited to 5 KHz and sampled at the Nyquist rate of 10 KHz formed by superposition of four 100 msec. pulses respectively containing frequencies of 1 KHz, 2 KHZ, 3 KHz and 4 KHz of equal average amplitude or power to additive white Gaussian noise (AWGN) which has a standard deviation of approximately 2.9 or, for purposes of discussion, an equivalent voltage of 2.9V RMS. The four pulses are also added at 2.9 VRMS or a SNR of 0 db. The duration of the upper trace, as illustrated, is one second or 10,000 samples. In the lower trace, an expanded portion containing 200 samples of the upper trace including an edge of the 1 KHz pulse is illustrated. Thus, the portion of the trace to the left of the bottom trace is pure noise and the portion to the right of the bottom trace includes a portion of the 1 KHz pulse of the data signal added to the noise. While the pulses are only marginally visible in the upper trace of FIG. 4, the change in the samples and even the cyclic nature of the signal in the pulse is somewhat more evident in the expanded trace where individual samples may be discerned, particularly if the signals within the illustrated windows A, B and C of equal length (representing a moving window of constant length at positions A, B and C) are compared. Therefore the statistical parameters of the signal clearly will change when a small data signal appears within noise of equal RMS amplitude (0 db SNR as compared to the +10 db SNR previously considered to be an effective limit for signal screening purposes when the nature of the signal is not previously known). It can also be appreciated from FIG. 4 that the change in statistical parameters may be more or less abrupt (e.g. among positions A, B and C) depending on the nature of the signal and the sliding/moving window length.

A well-known quantitative statistical measure of the variation shown in FIG. 4 is known as the variance which is simply the normalized sum of the squares of the magnitudes of the individual samples (e.g. the sum of the squares of the samples divided by the number of samples minus one), either long-term or within the window. Variance is also recognized to be a key meaningful statistic having to do with AWGN and is a measure of noise power. The addition of any data signal to noise should increase the power of the signal and be reflected in the computed variance. The variance of the signal illustrated in the upper trace is shown in FIGS. 5A-5F for windows of varying size/duration which are arranged in order of increasing window size. FIG. 5A shows variance for a window of 10 msec. (1/10 pulse width) in which the four respective pulses are clearly visible and have sharp "skirts" with near vertical edges at the beginning and end of each respective pulse. However, the base noise level between the pulses is relatively high and represents short-term variance of the noise itself within the window.

FIGS. 5B-5D shows the computed variance of the same waveform (FIG. 4) for a 25 msec. window (1/4 pulse width), a 40 msec window (4/10 pulse width) and a 60 msec window (6/10 pulse width, respectively. These graphs of variance show reduction of the appearance of noise both in regularity of the pulses and spaces between pulses and a reduction in apparent average variance in the regions between pulses where only noise is present. Thus, the likelihood of the presence of a small signal amid noise in accordance with the invention can be determined manually by observation or automatically by imposition of a threshold.

The slopes of the skirts of the pulses increases with increasing window duration and the amplitude of the variance due to the pulses begins to decrease significantly while the edges of the pulses become less distinct. FIG. 5E is of particular interest because it represents the case wherein the window is the same width as the pulse. As can be seen, the response is still quite distinct from the background noise, but the response for each pulse comes to a peak and has sloping skirts. If the window is wide enough such that it encompasses more than one received pulse, interpulse interference may result, leading to a response indicating simply that a data signal is present, consistent with the purposes of the invention: to determine what fidelity or degree of compression to use. In general, if more than one pulse is present in a window, a higher degree or fidelity of compression is desirable. In FIG. 5F, for example, interpulse interference begins to occur, resulting in a determination across the entire window to use a higher fidelity compression. However, with a wider window that causes interpulse interference, there is a loss of efficiency since the quiet period between pulses is also stored with a higher degree of fidelity when a greater degree and lower fidelity of compression would be adequate and higher fidelity is unnecessary. Thus, in summary, using variance to detect short term variation is favored by use of a variance window shorter than a pulse width while very short windows introduce noise (e.g. amplitude jitter) in the variance value and larger windows tend to smear and are less effective to indicate a small data signal and may thus tend to produce false positive indication of the presence of a small signal; leading, in the preferred application of the invention to saving of portions of the signal where no data is, in fact, present.

Using variance for detection, however, has the unavoidable drawback that noise itself has a non-zero variance and, therefore, the computed variance of a window containing an arbitrary signal including those periods of time that include noise without any data signal is always non-zero. This fact is particularly unfortunate in view of the significant dependence on the window size relative to the nature or particular parameters of the data signal (e.g. pulse width) even though the sensitivity of the invention using variance is relatively high if the window size is properly chosen; suggesting that data signals having amplitudes substantially below the noise amplitude can be detected in accordance with the invention as has been confirmed experimentally to a −1.6 db SNR.

Figure 9:
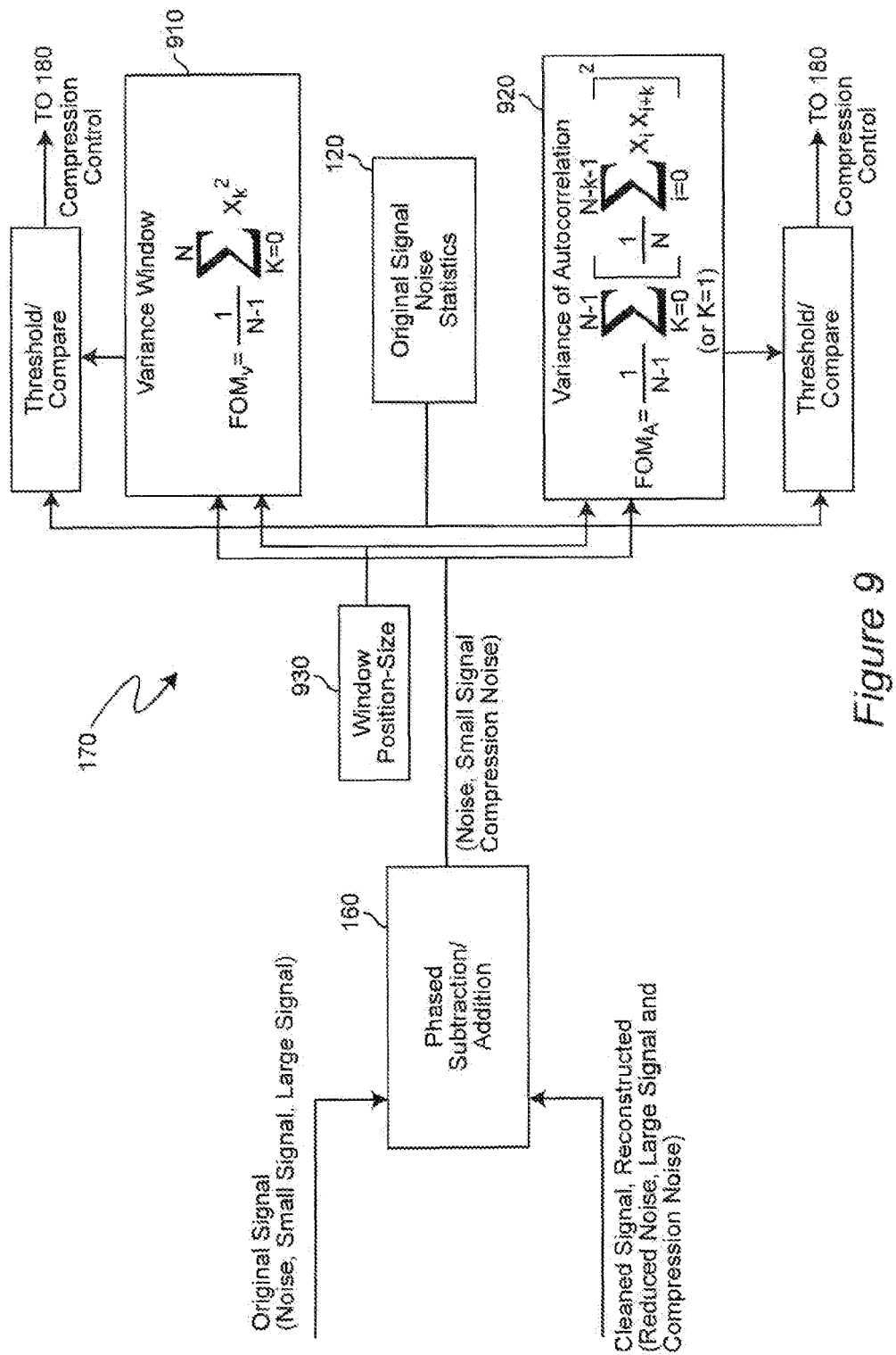
FIG. 9 is a preferred architecture for the short-term noise statistics variation detector (170 of FIG. 1) of the invention.

While numerous statistical parameters can be used to perform detection of a small signal in noise, it has also been found experimentally, that the statistical parameter of the signal chosen for detection has a major impact on the sensitivity of the detection process. In particular, autocorrelation or, more specifically, the variance of the autocorrelation has been experimentally found to provide substantial advantages over variance for practice of the invention. That is, for a given window width/duration of n samples, the computation of the autocorrelation (as illustrated in FIG. 9) yields n values for each position of the sliding window. Therefore, in accordance with a preferred embodiment of the invention, the n values of the autocorrelation for each window position are reduced to a single figure of merit by then computing the variance of the autocorrelation for all values in each window at respective positions as the window is moved. The variance of the auto-correlation has been experimentally found to be particularly sensitive for detecting small data signals in the presence of noise and which provides substantial advantages over the use of only the variance of the signal for the purpose.

Figure 6:
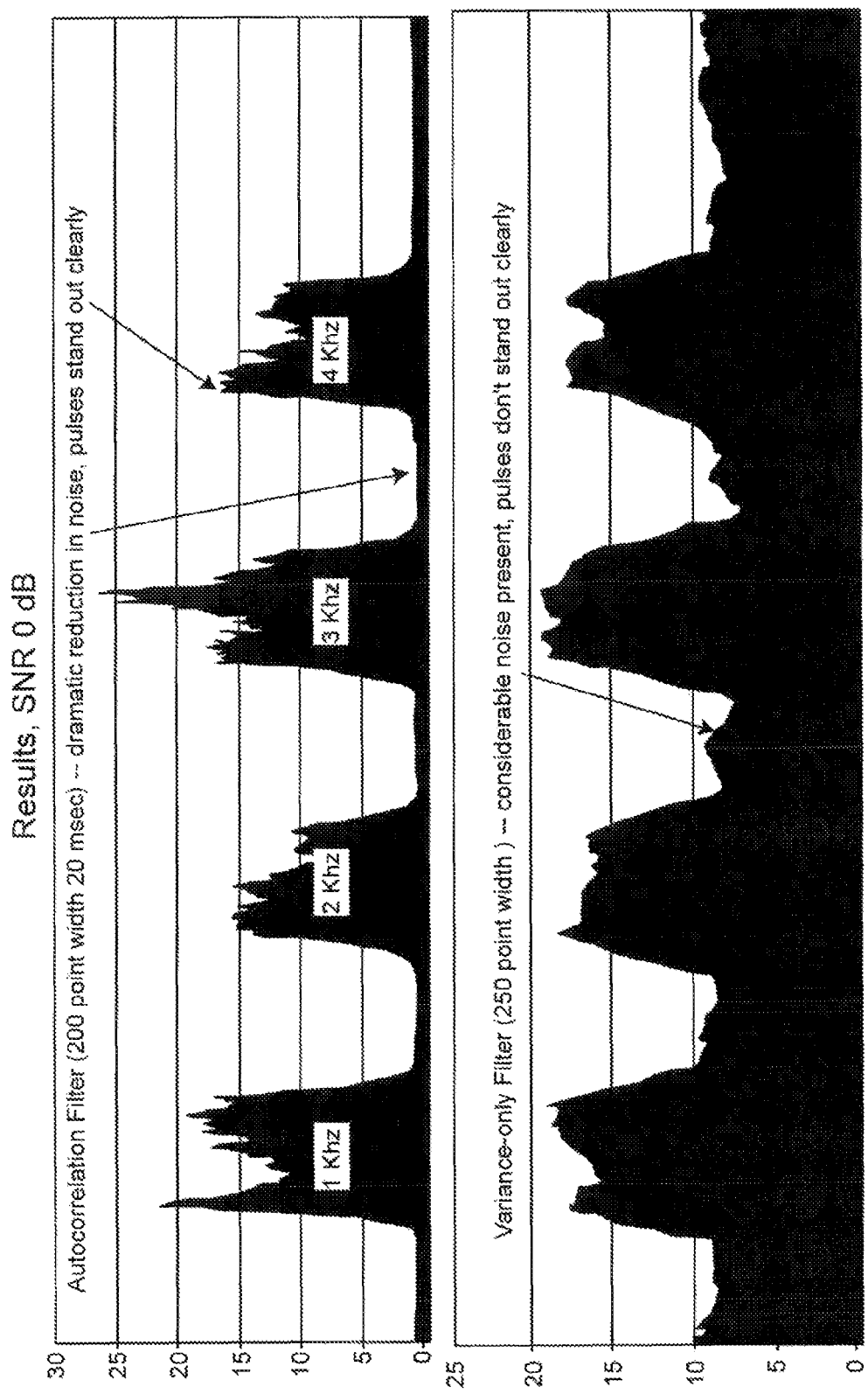
FIG. 6 is a graphical comparison of use of the variance of the autocorrelation with use of the variance alone for small data signal detection in the case of the small data signal and the noise having the same power (0 db SNR)

Referring now to FIG. 6 a comparison of autocorrelation and variance corresponding to the signal of FIG. 4 (again at 0 db SNR). The lower graph in FIG. 6 represents computed variance data for a 250 sample point (25 msec.) window and substantially corresponds to FIG. 5B, discussed above, while the upper graph represents the variance of the autocorrelation of the same data but for a window only 200 sample points or 20 msec. wide, which, as discussed above, is less than optimal for detection by use of signal variance alone but also provides a substantial reduction in required calculations. A comparison clearly reveals that the variance of autocorrelation values provides a dramatic reduction in values attributable to noise only and a much reduced base data level (principally because AWGN in the signal is, by definition, uncorrelated and the autocorrelation thus tends toward zero). The presence of the pulses stands out clearly with very steep sides of the skirts and a very large ratio between the variance of autocorrelation values where pulses are present and absent, respectively. Thus, the likelihood of the presence of a small signal amid noise based on variance of autocorrelation values in accordance with the invention can be determined even more readily and with higher confidence level by observation or imposition of a threshold.

Referring now to FIGS. 7A-7C, the effect of window size/duration on computed variance of autocorrelation data is illustrated. For this discussion, the original signal is again identical to that discussed above in connection with FIG. 4 except that an additional (fifth) "chirp" pulse has been added in which the frequency is swept from 2 KHz to 3 KHz. FIGS. 7A-7C result from window sizes of 10 msec., 20 msec. and 30 msec., respectively. It is clearly seen from a comparison that FIG. 7A includes significant amplitude jitter but the presence of the four constant frequency pulses is almost equally evident from each although there is some increase in ratio of autocorrelation value amplitude between the detected pulses and the absence thereof as the window is increased. Since the pulses are of different frequency but are detected with substantially equal sensitivity (e.g. the values corresponding to the pulses are of substantially equal amplitude over a range of frequencies) the use of variance of the autocorrelation also appears to be frequency independent.

Figure 7D:
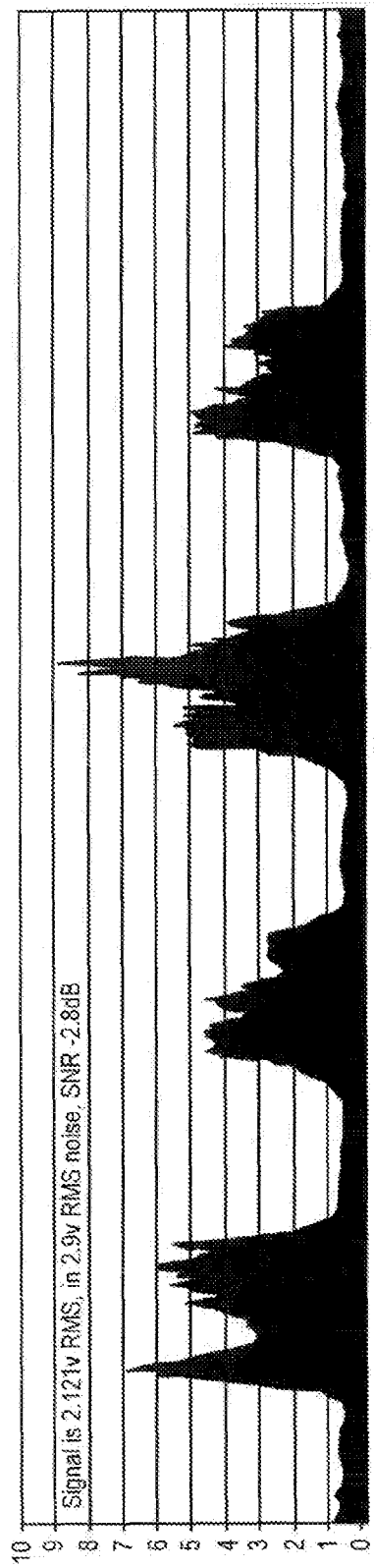
FIG. 7 shows the effect of window size on the result of small data signal detection using autocorrelation.
Figure 7E:
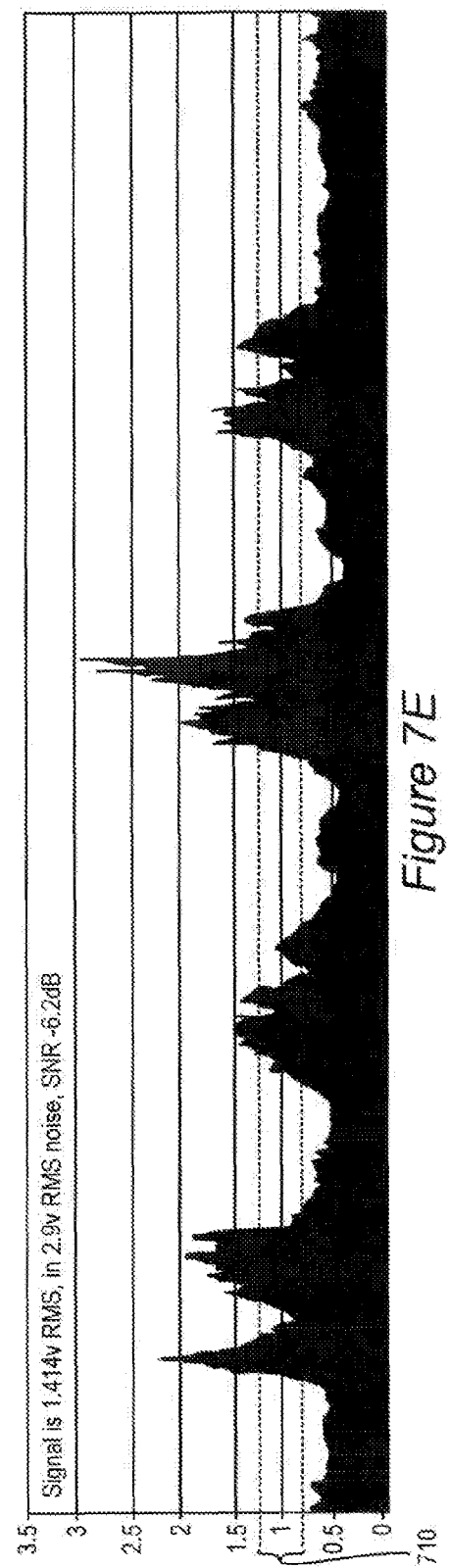

The increased signal ratio between peak values and base level values available from the use of variance of autocorrelation indicates the ability of the invention to detect signals substantially below the noise amplitude as shown in FIG. 7D for a −2.8 db SNR and, in fact, the ability to detect small data signals at a SNR of −6 db has been confirmed experimentally as shown in FIG. 7E in which the pulses are small but clearly visible above noise in the autocorrelation variance although the range of a threshold for discriminating the presence of signals from pure noise is becoming critically small as indicated by bracket 710. At an even lower SNR the amplitude resulting from the signal pulses decreases rapidly to the point where the pulses cannot readily be distinguished from the noise. Therefore, a −6 db SNR is considered to be an approximate threshold for obtaining useful detection in accordance with the invention. Nevertheless, this capability of the invention is thus a 16 db improvement over the limit previously considered possible for purposes of screening signals for data signals when the nature of the data signals is not known in advance.

The principal difference with window size/duration is seen in regard to the response to the chirp signal which diminishes in amplitude as the window duration increases. Therefore, some dependence on the nature of the detected signal is seen to remain but can be largely overcome by simply analyzing the same data with different sizes of window; such as by using windows differing in duration by factors of two and then smaller increments when additional signals appear. The use of shorter windows corresponds to a reduction in the number of required calculations and thus computation at a number of window sizes is not a significant increase in computational burden. Since both variance and autocorrelation are normalized relative to the number of samples, no correction or compensation is required when window size is changed. An additional benefit of using several different window sizes is that the behavior of the values of the variance of the autocorrelation with window size may yield signatures similar to that of the chirp signal discussed above and thus provide some gross characterization of the nature of the various small data signals which may be detected in accordance with the invention. This possibility is supported by the further different signature which results upon detection of a spread spectrum small data signal which will now be described.

FIGS. 8A, 8B and 8C shows graphs of the variance of autocorrelation, performed over window sizes of 10, 20 and 30 msec., respectively as described above, for four 100 msec. spread spectrum pulses (rather than the four fixed frequency pulses of FIG. 6) and, for reference, the chirp signal as discussed above in connection with FIGS. 7A-7C. All of these pulses are added to AWGN at 0 db SNR. Each of the four spread spectrum pulses includes 100 so-called "chips", each 1 msec. long and each at a different randomly chosen frequency covering a pass band of, for purposes of this example and comparison with examples discussed above, 0-5 KHz. (It should be recognized that all of the above frequencies and time intervals are merely representative and can be scaled in either direction as will be understood by those skilled in the art. That is, as long as the Nyquist criteria are satisfied, window duration could be on the order of microseconds or possibly nanoseconds or on the order of minutes, hours or days or longer.) While each pulse is constructed in a similar manner, each pulse differs from the others because the frequencies were chosen randomly. There is no guarantee that the pulses will contain the same frequencies although that may be likely. Due to the random sequence of frequencies in each pulse and the short duration of each chip within a pulse, spread spectrum signals are recognized to be extremely difficult to detect without knowing the signal characteristics or code in advance and, in fact, spread spectrum signals have been used to prevent detection thereof and thus enhance security of communications. The power spectral density for this signal is shown in FIG. 8D and gives little, if any, indication that a signal is, in fact, present and a time-frequency plot would show only noise.

It should be noted that the window sizes are comparable to those used above for detection of fixed frequency and chirp pulses as described above. Thus the preferred window sizes are much larger than the 1 msec. duration of any single chip of a spread spectrum pulse but that even the shortest (e.g. 10 msec.) is seeing ten chips, each at a different frequency.

As shown in FIGS. 8A-8C the spread spectrum pulses at 0 db SNR are readily detectable, particularly in view of the low base line values produced by the preferred use of the variance of the autocorrelation of the signal samples, and the sensitivity using a 30 msec. duration window is only slightly less than the sensitivity of the invention to a chirped pulse. It will be recalled that the sensitivity of the invention for detection of chirped pulses increased as the window was made shorter and the same is qualitatively true for spread spectrum pulses. However, as is evident from FIGS. 8A-8C, the increase in sensitivity is not as great as for chirped pulses; yielding a signature with change of window size for spread spectrum signals distinct from the signature with change of window size for fixed frequency pulses and chirped pulses. Nevertheless, spread spectrum signals which have been extremely difficult to detect prior to the invention are readily detected by the invention using the same range of window sizes as for other signals, thus allowing concurrent screening for all three types of signals which are largely representative of and cover a gamut of characteristics of most digital signals which are likely to exist. Quantitatively, for the 10 msec. window size, for 0 db SNR signals the indication of the spread spectrum pulses peak at about 6-8, the indication of the chirped signals peaks at about 14 and the indication of the single fixed frequency carrier wave pulses peaks at around 20-25. However, since the base value of the variance of the autocorrelation attributable to noise only is about 2, a minimum 3:1 detection margin, representing a substantial degree of sensitivity and degree of confidence of detection is provided in accordance with the invention.

The preferred architecture of the short-term statistics variation detector 170 and its cooperation with other elements of the invention shown in FIG. 1 is illustrated in FIG. 9. As described above, the original signal containing noise and possibly large and/or small signals and the reconstructed (after lossy or lossless compression) cleaned signal containing reduced original noise, compression noise and possibly large signals but not many small signals which may have been present in the original signal are subtracted or added in proper phase relationship at 160 to yield a signal with the original signal containing the original noise and any small signal, compression noise and noise and any small signals passed by noise reduction filter 130 (but which will have been changed thereby); the large signal (preferably already compressed and archived) and a residue of the original noise and small signals (corresponding to the amount of noise cleaned from the original signal) being removed by the subtraction 160. The cleaning process generally involves the computation of statistics of the noise in the original signal and these statistics are available from element 120, as shown. The inserted compression noise is partially predictable and does not adversely affect the operation of the invention in accordance with the basic principles thereof although its presence may be useful at a cost of slight reduction of efficiency as alluded to above.

Using the results of the subtraction process, either the variance 910 or the variance of the autocorrelation 920 of samples corresponding to a moving window of one or more chosen sizes, as specified at 930, is computed and a Figure of Merit (FOM$_V$=the variance of the samples and the preferred FOM$_A$ equals the variance of the autocorrelation of the samples corresponding to the window for each position of the moving/sliding window) is computed corresponding to each sample position. A threshold is then imposed on the result, for example, by comparison to the statistics of the portion of the original signal which is considered to represent only noise (e.g. by assumption, long-term samples or the like). The threshold may be chosen or the noise statistics compensated to accommodate the level of baseline values in either the sample variance or the autocorrelation variance and the result of comparison with such a threshold used to control the degree of compression, if any, applied to the noise signal for storage when the existence of a small signal is determined to be likely.

The determination of a threshold for discriminating conditions amid noise are well-understood in the art and, in any event, are not critical to the practice of the invention. In general, simple establishment of a static threshold will be sufficient for practice of the invention but more sophisticated arrangements such as imposing plural static or dynamically changing thresholds based on the signatures of signals detected or the level of interest in particular signals found and the characteristics determined by analysis thereof. Stored compressed small (and/or large) data signals can be reconstructed from data compressed and stored in accordance with the basic principles of the invention and effectively sorted for further analysis and possibly recompressed for storage based on particular characteristics thereof (e.g. to limit remaining signals to only chirped or spread spectrum signals if found to be of particular interest). In summary, while the basic principles of the invention avoid any need for advance knowledge of the nature or characteristics of any signal which may exist amid noise, once a signal has been detected or captured so that some of its characteristics can be determined, the invention can also be employed to perform numerous processing operations for sorting, recompressing to smaller volume and the like by thresholding manipulations and other processing which may be controlled in response thereto as will be apparent to those skilled in the art from the above description of the invention.

While numerous techniques for computing variance and autocorrelation are known in the art, in the interest of completeness, sample algorithms (in interpreted BASIC) for performing the computations of sample variance and autocorrelation variance for a moving window are as follows:

Sample Variance:

```
100 rem creates a moving variance of input data and writes to file
120 rem variance windows of varying lengths as specified in data statement
140 dim v(10000)
160 open "out0snr.csv" for input as #1
180 for i=1 to 10000
200 input #1, v(i): print i, v(i)
220 next i
240 close #1
260 data 100, 250, 400, 600, 1000, 1500
280 fot j=1 to 6
300 read l
320 open "win"+mid$(str$(l),2)+".csv" for output as #2
340 ' create initial variance
360 sum=0:for i=1 to l:sum=sum+v(i)*v(i)/(l−1):next i
380 ' start moving average
400 for i=l+1 to 10000
420 sum=sum+v(i)*v(i)/(l−1)−v(i−l)*v(i−l)/(l−1)
440 print #2, using "###.####"; sum
460 print using "###.####"; sum
480 next i
500 close #2
520 next j
540 end
```

Autocorrelation Variance for a Moving Window:

```
100 rem creates autocorrelation of input file
110 dim v(9999)
115 input "What is the name of the input file";i$
117 input "What is the name of the output file";o$
118 input "What is the window size";n
120 open i$ for input as #1
130 for i=0 to 9999
140 input #1, v(i)
150 next i
160 close #1
170 open o$ for output as #2
175 print #2, "Input file",i$
177 print #2, "Output file",o$
178 print #2, "Window size",n
180 for j=0 to 9999−n
190 bigsum=0
200 for k=0 to n−1
210 sum=0
220 for i=0 to n−1−k
230 sum=sum+v(i+j)*v(i+k+j)
240 next i
250 sum=sum/(n−1)
260 bigsum=bigsum+sum*sum
270 next k
280 bigsum=bigsum/(n−1)
290 print #2, using "###.####"; bigsum
300 print j
310 next j
320 close #2
330 end
```

It can be appreciated that either the sample variance or autocorrelation variance computation can be programmed using a relatively few lines of code and even for potentially large number of samples which correspond to a moving/sliding window of a given size. (The above code is, however, not optimized for processing efficiency.) Even though computation of the autocorrelation variance is much slower than computation of sample variance, the computation can be performed with sufficient speed for near real-time screening of data as it is acquired from most sources appropriate to the exemplary applications alluded to above. Moreover, recently developed so-called cell processors are believed to be excellently applicable to this type of computation and should provide much enhanced processing speed. Further, while detection using autocorrelation variance is much preferred for its increased sensitivity and higher confidence level of the results thereof, if additional screening speed is required, the screening can be performed using the much more rapidly calculated sample variance.

A variant form of this process omits the first term of the autocorrelation process since the first term of the autocorrelation calculation is simply the variance. It will be recalled from the above discussion that for additive white Gaussian noise (AWGN), since it is uncorrelated, all the power is theoretically in the variance and none of the power is in the remainder of the terms of the autocorrelation. Therefore, in theory, the omission of the first (zeroth) term in the autocorrelation calculation should decrease the sensitivity of the system to noise.

Figure 10A:
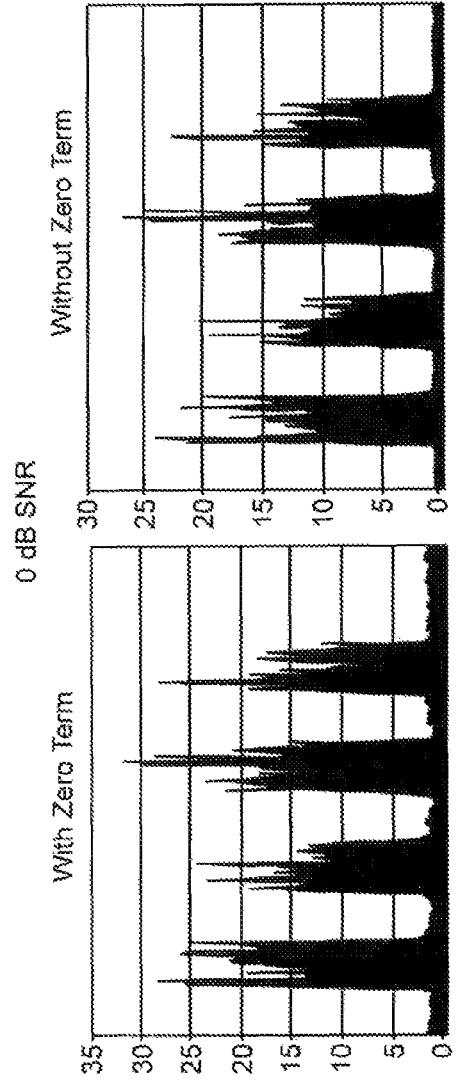
FIG. 10 is a graphical comparison of effects of a variation of the computation of the variance of the autocorrelation in accordance with the invention in which the first term (sometimes referred to as the zeroth term) of the autocorrelation is omitted.
Figure 10B:
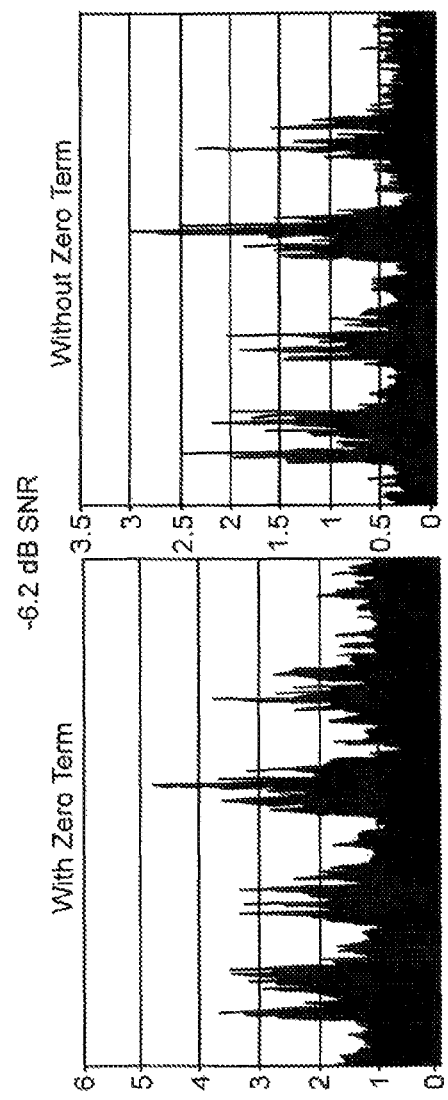

In practice, the improvement is relatively slight as illustrated in the comparisons mad in FIGS. 10A and 10B. However, the usefulness of the improvement increases with decreasing SNR. The graphs shown in FIG. 10A for a 0 db SNR are very similar although a proportionately slight decrease the noise in the variance of the autocorrelation is observable. In FIG. 10B however, the graphs for a −6.2 db SNR (at a much larger scale than FIG. 10A) where the values corresponding to pulses are much smaller, the reduction in noise (proportionate to the reduction shown in FIG. 10A become much more significant, yielding increased visibility and thresholding window for detection of very low level signals. Omission of the zeroth term also slightly reduces the number of required calculations. Therefore, at least for detection of very small signals, omission of the zeroth term of the autocorrelation is preferred.

In view of the foregoing, it is seen that the invention provides a rapid and sensitive method and apparatus for screening of signals to determine if a data signal is present or likely to be present therein. The invention is effective for detection of spread spectrum signals which have heretofore been extremely difficult to detect as well as for detection of signals at lower SNR than has been possible, particularly in regard to signals of which the characteristics are not known in advance. The invention can be implemented in many forms including using special purpose hardware or processing circuits such as application specific integrated circuits or using a software program stored on a computer readable medium or transmitted as a digital signal over a transmission medium for controlling a general purpose data processor and implemented as a stand-alone device or included in or attached to a recording and/or monitoring instrument.

While the invention has been described in terms of a single preferred embodiment, those skilled in the art will recognize that the invention can be practiced with modification within the spirit and scope of the appended claims.

We claim:

1. A computer readable storage medium for providing a digital signal to a digital data processor, said digital signal, when executed on said digital data processor, controlling said data processor to perform steps of
   filtering noise from an original signal to produce a filtered signal,
   performing a phased subtraction or addition of said filtered signal from or to said original signal or vice-versa to produce a noise signal,
   computing variance of an autocorrelation of said noise signal over at least a first period and a second period of said noise signal, said first period and said second period being of equal duration, and
   controlling at least one of storage and compression of said noise signal based on a result of said step of computing variance of an autocorrelation.

2. The computer readable storage medium as recited in claim 1 including signals for controlling said data processor to perform the further steps of
   computing variance of an autocorrelation of said noise signal over at least a third period and a fourth period of said noise signal, said third period and said fourth period being of equal duration different from that of said first period and said second period, and
   controlling at least one of storage and compression of said noise signal based on a result of said step of computing variance of an autocorrelation of said first and second periods or said third and fourth periods.

3. A method of reducing storage or compression of a signal which is unlikely to contain a small data signal, said method comprising
   providing a program to a data processor, said program being capable of configuring said data processor to provide:
   a filter for filtering noise from an original signal to produce a filtered signal,
   a calculator for performing a phased subtraction or addition of said filtered signal from or to said original signal or vice-versa to produce a noise signal,
   a statistical calculator for computing variance of an autocorrelation of said noise signal over at least a first period and a second period of said noise signal, said first period and said second period being of equal duration, and
   a storage medium or a controllable compression arrangement for performing at least one of storage and compression of said noise signal responsive to said statistical calculator providing a result of said step of computing variance of an autocorrelation.

4. The method recited in claim 3 further including configuring said digital data processor to provide:
   a statistical calculator for computing variance of an autocorrelation of said noise signal over at least a third period and a fourth period of said noise signal, said third period and said fourth period being of equal duration different from that of said first period and said second period, wherein said storage medium or said controllable compression arrangement controls at least one of storage and compression of said noise signal responsive to said calculator providing a result of said computation of a variance of an autocorrelation of said first and second periods or said third and fourth periods.

5. The method recited in claim 3, wherein said program is capable of configuring said processor such that said statistical calculator performs the further steps of
   determining statistics of said noise, and
   determining differences between said statistics of said noise and said statistics of said signal.

6. The method recited in claim 3, wherein said program is capable of configuring said processor such that said statistical calculator provides the further steps of
   imposing a window on a portion of said signal,
   computing autocorrelation of said signal within said window, and
   computing variance of autocorrelation values resulting from said step of computing autocorrelation within said window for a particular position of said window.

7. The method recited in claim 6, wherein said program is capable of configuring said processor such that said statistical calculator provides the further steps of
   moving said window to another portion of said signal,
   computing autocorrelation of said signal within said window, and
   computing variance of autocorrelation values resulting from said step of computing autocorrelation within said window for a particular position of said window.

8. The method recited in claim 7, wherein said program is capable of configuring said processor such that said statistical calculator provides the further steps of
   altering a size of said window to form an altered size window, and
   repeating said steps of computing autocorrelation within a window, computing variance of values of autocorrelation, moving said window, computing autocorrelation of said signal and computing variance of autocorrelation values of said signal over said window of altered size.

9. The method as recited in claim 8, wherein said step of determining said likelihood is performed by comparing said variance of said autocorrelation values with a threshold.

10. The method as recited in claim 6, wherein said step of determining said likelihood is performed by comparing said variance of said autocorrelation values with a threshold.

11. The method as recited in claim 3, wherein said step of determining said likelihood is performed by comparing said variance of said autocorrelation values with a threshold.

* * * * *